United States Patent [19]

Crack

[11] Patent Number: 4,916,964
[45] Date of Patent: Apr. 17, 1990

[54] REMOTE CONTROL MECHANISM

[75] Inventor: David J. Crack, Chelmsford, England

[73] Assignee: Morse Controls Limited, Basildon, England

[21] Appl. No.: 321,884

[22] Filed: Mar. 10, 1989

[30] Foreign Application Priority Data

Mar. 15, 1988 [GB] United Kingdom ............ 8806102

[51] Int. Cl.[4] .............................................. G05G 9/16
[52] U.S. Cl. .................................. 74/473 P; 74/473 R; 74/471 XY; 74/501.5 R; 74/501.6
[58] Field of Search ............ 74/473 P, 473 R, 471 R, 74/471 XY, 501.5 R, 501.6

[56] References Cited

U.S. PATENT DOCUMENTS

| 3,517,568 | 6/1970 | Payerle ................. | 74/471 XY X |
| 4,112,976 | 9/1978 | Sala ..................... | 74/471 XY X |
| 4,483,211 | 11/1984 | Hurlow ................ | 74/473 R |
| 4,524,635 | 6/1985 | Hulin et al. ........... | 74/473 R |
| 4,619,152 | 10/1986 | Suzuki ................. | 74/473 P |
| 4,676,350 | 6/1987 | Shinokawa et al. ... | 74/471 XY X |
| 4,693,135 | 9/1987 | LaRocca et al. ...... | 74/473 P X |

Primary Examiner—Peter A. Aschenbrenner
Attorney, Agent, or Firm—James Creighton Wray

[57] ABSTRACT

A remote control mechanism has a gear lever 1 pivotable about mutually perpendicular axes 2 and 3 of which the latter is the longitudinal axis of a torque tube 19. When pivoted about the axis 3, the gear lever will rotate the torque tube 19 about its axis and cause, via a lever arm 23, a translational movement of the core 26 of a short push-pull cable 27 to effect a rail select movement of a gear select and shift finger. When the gear lever 1 is pivoted about the axis 2, an arm 7 fast with the gear lever will translate the core 8 of a relatively long push-pull cable 9 to cause the finger to shift the selected rail and so effect a gear change. The point of interconnection 10 of the core 8 with the arm 7 will make arcuate movement about the axis 3 of the torque 19 when the gear lever is pivoted about that axis in the rail select mode, and such arcuate movement will tend to cause unwanted rail shift translation of the core 8 with attendant possible baulking of the gear change system. To overcome this problem, the casing 11 of the cable 9 is made rotationally fast with the torque tube 19 by means of a rigid member 12 in which the cable casing is mounted and clamped against movement and to which the torque tube is affixed. Thereby, when the torque tube 19 is rotated by a rail select pivotal movement of the gear lever 1, the rail shift cable 9 will bodily move through the same arc of movement as the interconnection 10 between the cable core 8 and the lever arm 7 so obviating the undesirable tendency of the cable core to make an unwanted rail shift translation.

16 Claims, 2 Drawing Sheets

REMOTE CONTROL MECHANISM

This invention relates to remote control mechanisms.

A remote control mechanism is known having a control member pivotable about mutually displaced axes to effect through a pair of control links different modes of operation of a controlled device. Specifically, the remote control mechanism may operate a gear change device of a manual change gear box with the control member being a gear lever which when pivoted about one axis displaces one of the control links to effect a rail select movement of the gear change device and which when pivoted about the other of the mutually displaced axes displaces the other of the control links to effect a shift movement of the selected rail thereby to change gear.

Whilst the aforesaid pivotal movements of the gear lever should operate only one of the control links at a time, in the known remote control mechanism, when the gear lever is pivoted to effect through said one control link a rail select movement of the gear change device the other control link is caused at the same time to make a small degree of unwanted operational movement which could cause the gear change system to baulk. In fact, a skilled driver would feel resistance in the system against such movement and would take remedial action by urging the gear lever in an arcuate transverse path considered in plan, rather than straight across the "gate", to compensate for such unwanted operational movement. However, the onus is entirely on the driver to prevent the described unwanted operational movement.

In accordance with the present invention, a remote control mechanism comprises a control member movable in different control modes, a first control link means interconnected with said control member such as to be caused to make a control movement in response to said control member being moved in a first one of its said control modes, a second control link means interconnected with said control member such as to be caused to make a control movement in response to said control member being moved in a second one of its said control modes, movement of said control member in its said first control mode resulting in movement of the inter-connection of the second control link means with said control member, and means interconnecting said first and second link means to cause said second link means to move with said first link means as said first link means is caused to make its said control movement in response to said movement of said control member in its said first control mode by which to compensate for said movement of said interconnection of said second control link means with said control member at that time which otherwise could result in unwanted control movement of said second control link means.

When the invention is applied to a gear change system as hereinbefore described, the tendency of the control link to make an unwanted degree of rail shift movement, when the rail select control link is operated, is obviated with the attendant advantage that any possibility of the gear change system to baulk in the event of the driver not taking remedial action is removed.

In the known remote control mechanism the control links are constituted by a flexible two cable unit. Such cables run from the gear lever to the gear box area and their lengths can be considerable as well as involving a number of bends in the cable. Also, the two cable unit is fixed to the floorpan of the vehicle, and there can result noise transmission from the gear box area to the passenger compartment.

In an embodiment of the invention at present preferred, a remote control mechanism employs a gear lever which when pivoted about one axis to cause a rail select movement of the gear change device rotates a torque transmission member such as a torque tube which is taken from the gear lever vicinity into the gearbox area at which it is supported by a convenient part of the vehicle chassis, for example the engine/gearbox subframe. That end of the torque tube is connected by a relatively short flexible cable or rod to the gear change device such that rotation of the torque tube will translate the cable core or rod to effect a rail select movement of the device. The gear lever is also connected by a relatively long flexible cable to the gear change device so that pivotal movement of the gear lever about another axis displaced from said one axis is transmitted directly by that flexible cable to the gear change device to effect a shift movement of the selected rail.

The operative interconnection of the gear lever with the relatively long rail shift cable is such that when the gear lever is pivoted to effect through the torque tube a rail select movement, the end of the core of the rail shift cable at that operative interconnection is rotated out of the line of action of the cable. As such, there is a tendency for the core to be translated, and this tendency is eliminated by clamping the casing of the rail shift cable, at a point spaced from the interconnection of the gear lever with the cable core, to the torque tube so that the rail shift cable as a whole will be bodily rotated with the torque tube through the same degree of angular movement as the end of its core interconnected with the gear lever.

Also, with the described construction of that preferred embodiment, the aggregate length of the flexible cable run is reduced since the length of the rail select cable is able to be minimised and the transmission of noise from the gearbox area is also reduced by supporting the distal end of the gear select linkage, specifically the torque tube, by the engine/gearbox subframe.

Whilst the invention is described specifically herein in the environment of use as a gear changer, it is to be understood that it is not limited to that environment but has other applications involving the control of a controlled device constituted by a single or more operating members of which different movements can be induced by a single lever control.

In order that the invention may be well understood there will now be described two embodiments thereof, given by way of example, with reference to the accompanying drawings, in which.

In the two figures, like parts are denoted by like references.

Figure 1:
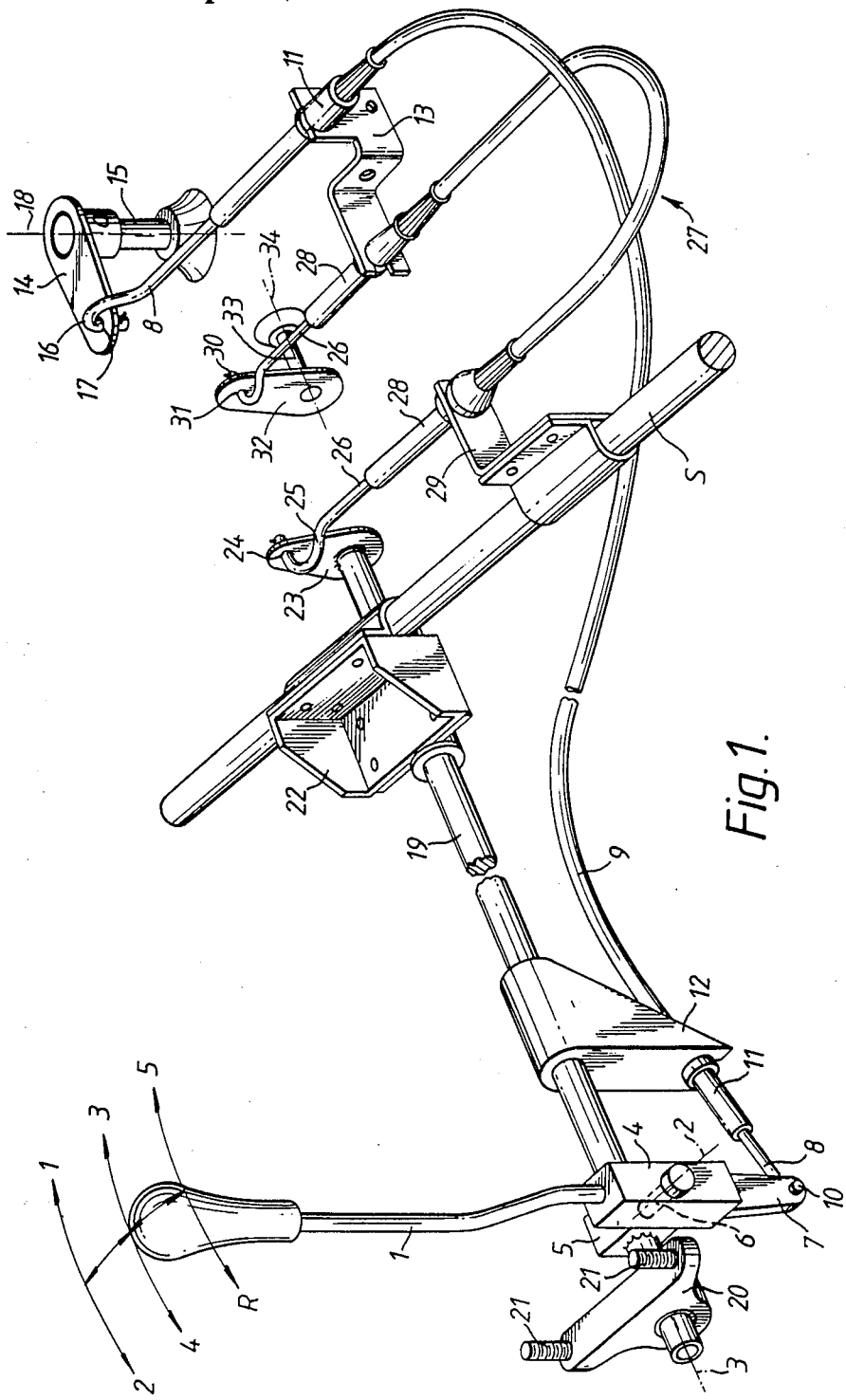
FIG. 1 is a schematic representation of a preferred gear change system.

Referring first to FIG. 1, a gear lever 1 is pivotable about mutually perpendicular axes 2 and 3. The lower end of the gear lever 1 is mounted in a block 4 which is affixed to another block 5 by a pivot pin 6 so that the block 4 and hence the gear lever can be pivoted relative to the block 5 about the transverse axis 2, which is the longitudinal axis of the pivot pin.

From the lower end of the block 4 depends an arm 7 which is fast with the block and which is attached to the core 8 of a flexible push-pull cable 9 by a pivot pin 10 parallel to the pivot pin 6. The end of the cable 9 proximal to the gear lever 1 has its casing 11 mounted and clamped against movement in the lower part of a rigid member 12. At the distal end of the cable 9 which runs to the vicinity of the gearbox, the cable casing 11 is held in a member 13 mounted to the engine or gearbox against translational movement and its core 8 is suitably operably attached to a lever 14 affixed to a vertical rail shift shaft 15. As shown, the core 8 has a hooked end 16 which is hooked into a vertical aperture 17 in the lever 14 so that translation of the core effects, via the lever, rotation of the shaft 15 about its longitudinal axis 18.

With the arrangement as so far described, manual pressure in a fore or aft direction applied to the gear lever 1 to cause it to pivot about the transverse axis 2 will translate the core 8 of the flexible cable 9 in a push or pull mode (depending on the sense of pivotal motion of the gear lever) to rotate the shift lever 14 and so the rail shift shaft 15 in an attendant sense to cause a gear select and shift finger (not shown) to shift the selected rail and so effect a gear change through a mechanism which is not illustrated but which can take any of a number of different known constructions and which need not be further described here since it forms no part of the present invention.

Describing now the rail select structure, the block 5 is mounted upon and is fast with a torque tube 19, which may take the form of a solid rod, running lengthwise of the vehicle. The torque tube 19 has its end proximal to the gear lever 1 journalled for rotation in a bearing block 20 which is affixed by studs 21 to the underside of the floorpan (not shown) of the vehicle. The distal end of the torque tube 19 runs to the vicinity of the gearbox and is mounted for rotation in a bracket 22 which itself is mounted to a convenient vibration isolated part of the vehicle chassis such as the engine/gearbox subframe (not shown). Alternatively or additionally, the required degree of vibration isolation could be provided by mounting the torque tube 19 via a rubber bush in the bracket. Between its proximal and distal ends, the torque tube 19 extends through and is affixed to the upper part of the rigid member 12 supporting the flexible cable 9.

To the distal end of the torque tube 19 is made fast a lever arm 23 which has a horizontal aperture 24 into which hooks the bent end 25 of the core 26 of a short flexible push-pull cable 27. The casing 28 of the cable 27 in its region proximal to the lever arm 23 is clamped against translational movement in a member 29. The member 29 is mounted upon a steering rack arm S of the vehicle which is supported by the bracket 22 to the aforementioned subframe.

At the opposite end of the short run of cable 27, its casing 28 is clamped against translational movement and mounted in the member 13 which thus maintains the distal end of the long and short cables 9 and 27, respectively, in mutually spaced relationship. Also, the core 26 has a bent distal end 30 which is hooked into a horizontal aperture 31 in a rail select lever arm 32 affixed to a horizontal rail select shaft 33.

When transverse manual pressure is applied to the gear lever 1, the torque tube 9 will rotate about its longitudinal axis 3 within the bearing block 20 and the bracket 22 with the result that the lever arm 23 will rotate to translate the core 26 of the cable 27 which, via the lever arm 32, will rotate the rail select shaft 33 about its horizontal axis 34 in a sense dependent upon the direction in which the gear lever 1 is transversely pivoted. Such rotation of the rail select shaft 33 will cause the gear select and shift finger to make a rail select movement again through a mechanism which is not illustrated but which can, as before, take a number of different forms which need not be further described here since it forms no part of the present invention.

With the described mechanism, the gear rail select and shift functions are effected independently of one another. In practice, the driver would, of course, pivot the gear lever 1 transversely into the appropriate rail select mode and then pivot the gear lever fore or aft to effect the required rail shift to effect a gear change. As illustrated, the driver has five forward gears available as well as a reverse gear. An appropriate gate could be provided within which the gear lever 1 is movable, although this is not necessary where the construction of the gear box itself dictates the operational movement available to the gear lever.

When the gear lever 1 is pivoted transversely about the longitudinal axis 3 to rotate the torque tube 19 and hence translate the core 26 of the rail select cable 27, the arm 7 will rotate in sympathy about that axis and, in consequence, tend to translate the core 8 of the rail shift cable 9 and cause the gear change system to baulk unless the driver, upon sensing the resistance to movement, takes remedial action by swinging the gear lever in an arc to one side of the central pivotal plane. Such unwanted motion of the rail shift cable 9 is eliminated, without any necessity for action on the part of the driver, by the provision of the rigid member 12 which will rotate with the torque tube 19 and so bodily move the rail shift cable in its casing region supported in the rigid member through the same arc of movement as the proximal end of the cable core 8 pinned to the arm 7.

Loads in the short rail select cable 27 are reacted at the bracket 22 supporting the distal end of the torque tube 19 and hence are dissipated by the engine/gearbox subframe. Moreover, the torque tube 19 is axially fixed at its distal end only, its end proximal to the passenger compartment being free to slide axially in the bearing block 20. The effect of this is that "into-gear" loads imposed on the long cable 9 are also transmitted through the torque tube 19 into its fixed distal end and are, consequently, also largely taken by the engine/gearbox subframe. Therefore, by mounting the fixed, distal end of the torque tube 19 on a vibration isolated bracket and/or vibration isolated part of the vehicle chassis, the noise transmission to the passenger compartment both upon rail select and shift operations is reduced as also is the degree of noise transmission of the engine and gearbox.

Again, since the proximal end of the torque tube 19 is free to slide longitudinally in the bearing block 20, there is compensation available for errors in the length of the torque tube or its mounting positions.

If a cross gate position spring bias mechanism is to be provided, for example a ¾ position bias, this can be situated at either end of the torque tube 19, thus reducing another possible source of noise which would otherwise be transmitted to the passenger compartment.

With the torque tube 19 extending from the gear lever 1 to the gearbox area, the length/number of bends in the gear select cable 27 is/are able to be reduced, with consequent reduction in the amount of lost motion and drag.

Whilst the proximal and distal ends of the short rail select cable 27 and the distal end of the long rail shift cable 9 are shown and described as being bent and hooked into apertures in the respective lever arms, it will be appreciated that other connections between the cable cores and lever arms are possible such as pinned connections permitting the necessary degree of relative pivotal movement between the lever arms and the cable cores.

In an alternative arrangement where the lever arms 23 and 32 are juxtaposed, the short cable 27 could be replaced by a rigid link such as a rod.

Figure 2:
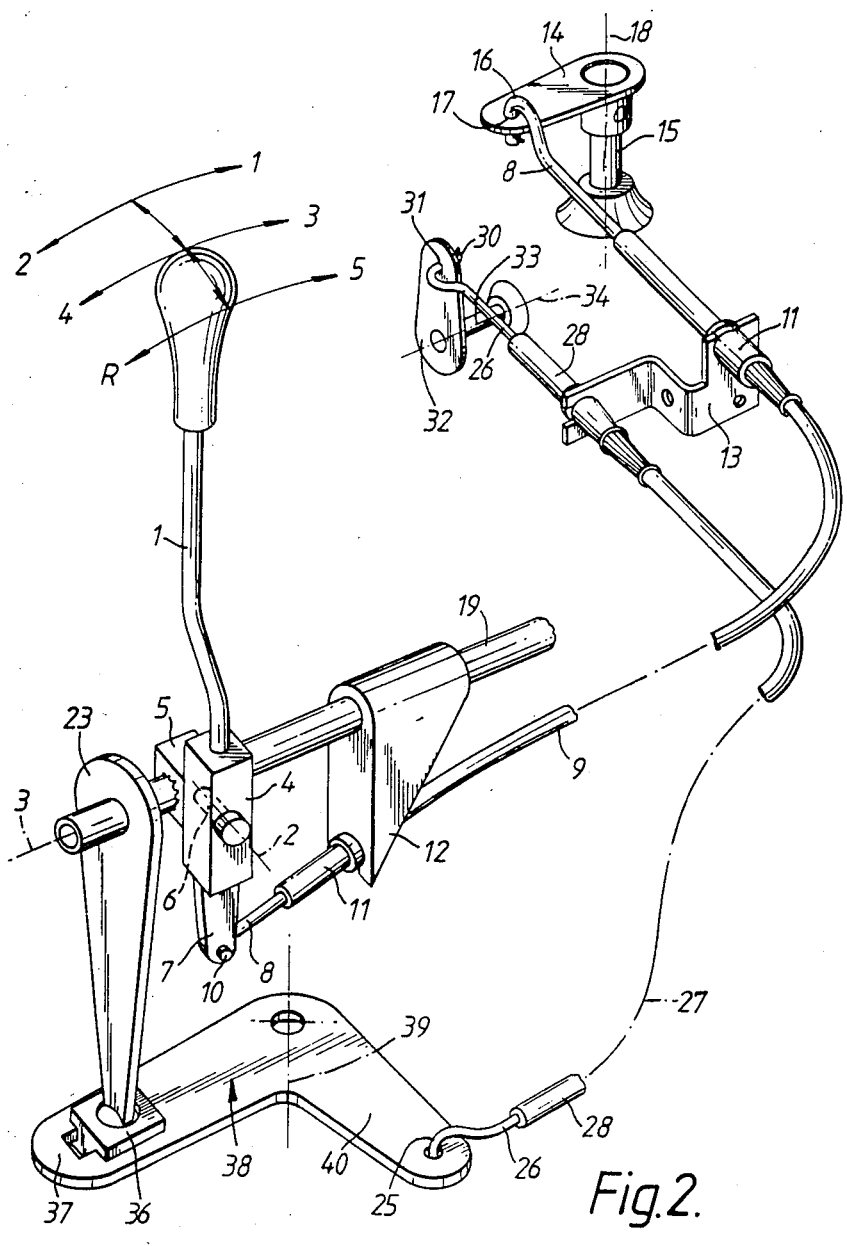
FIG. 2 is a schematic representation of an alternative gear change system.

Referring now to FIG. 2, an alternative gear change system is shown which, instead of comprising (as in FIG. 1) a long torque tube 19 running from the gear change lever 1 to the vicinity of the gear box, there to have its distal end connected by the lever arm 23 to the short rail select cable 27, has a short torque tube 19 and a long rail select cable 27 running to the vicinity of the gear change lever 1.

In this alternative construction, the lever arm 23 is made fast with the proximal end of the torque tube 19 and is suitably operatively interconnected with the proximal end of the core 26 of the long rail select cable 27. As shown, such interconnection could be provided by the lever arm 23 extending vertically downwards from the torque tube 19 to make operative interconnection via a sliding ball joint 36 with an input arm 37 of a horizontal bell crank lever 38 which is pivotal about a vertical pivot axis 39 and whose output arm 40 is operatively interconnected with the proximal end of the core 26 as by the bent end 25 of the core hooking into that output arm as shown or by a pinned connection being provided between the core 26 and the output arm 40.

With the described alternative gear change system, when the gear change lever 1 is pivoted transversely in its rail select mode, the short torque tube 19 is pivoted about its longitudinal axis 3 as before to pivot the lever arm 23, and this lever arm via the sliding ball joint 36 will turn the bell crank lever 38 about its vertical axis 39 thereby to cause its output arm 40 to effect a rail select translation of the core 26 of the rail select cable 27. Whilst the bell crank lever 38 is shown as horizontal and pivotal about a vertical axis 39, it could be mounted in other orientations with the lever arm 23 orientated appropriately, provided the axis of rotation 39 passes through the longitudinal axis of rotation 3 of the torque tube 19.

The proximal and distal ends of the short torque tube 19 together with pivot means (not shown) mounting the bell crank lever 38 for its pivotal movement could all be journalled in a common frame fast with the vehicle chassis to which frame the casing 28 of the rail select cable 27 at its proximal end would be clamped against movement.

Other than the described modifications, the alternative gear change system illustrated in FIG. 2 could have the configuration of the preferred FIG. 1 system. Thus, the facility of the alternative system to prevent baulking due to the tendency of the rail shift cable 9 to translate when the gear change lever 1 is shifted in the rail select mode remains as before with the rigid member 12 swinging the cable 9 bodily as the torque tube rotates to compensate for the arm 7 swinging the proximal end of the core 8 out of the line of action of the rail shift cable at that time.

The alternative gear change system would not, of course, possess the other described advantages of the preferred embodiment attendant upon the combination of a long torque tube and short rail select cable.

As another alternative when used with a single shaft rather than the described double shaft gearbox, the rail shift cable 9 and rail select cable 27 (or rod) would be arranged selectively to operate that single shaft so as to rotate the shaft in one operational mode and translate the shaft in the other operational mode.

I claim:

1. A remote control mechanism comprising a control member movable in different control modes, a first control link means interconnected with said control member such as to be caused to make a control movement in response to said control member being moved in a first one of its said control modes, a second control link means interconnected with said control member such as to be caused to make a control movement in response to said control member being moved in a second one of its said control modes, movement of said control member in its said first control mode resulting in movement of the interconnection of the second control link means with said control member, and means interconnecting said first and second link means to cause said second link means to move with said first link means as said first link means is caused to make its said control movement in response to said movement of said control member in its said first control mode by which to compensate for said movement of said interconnection of said second control link means with said control member at that time which otherwise could result in unwanted control movement of said second control link means.

2. A remote control mechanism as claimed in claim 1, wherein said control member is pivoted about a first pivot axis when moved in said first control mode, and wherein said control member is pivoted about a second pivot axis, which is angularly displaced from said first pivot axis, when moved in said second control mode.

3. A remote control mechanism as claimed in claim 2, wherein said first and second pivot axes are mutually perpendicular.

4. A remote control mechanism as claimed in claim 3, wherein said first link means has a longitudinal axis about which it rotates when making its said control movement, and wherein said second link means axially translates when making its said control movement.

5. A remote control mechanism as claimed in claim 4, wherein said first link means is a torque tube, and wherein said second link means is a push-pull cable.

6. A remote control mechanism as claimed in claim 5, wherein said push-pull cable has a core which translates within a casing when said second link means makes its said control movement, said core being interconnected with said control member, and wherein said interconnecting means interconnects said casing with said torque tube.

7. A remote control mechanism as claimed in claim 6, wherein the interconnection of said core with said control member is spaced from said longitudinal axis of said torque tube such that pivotal movement of said control member about its said first pivot axis will not only rotate said torque tube about its said longitudinal axis but will also rotate the interconnected end of said core out of the line of action of said cable resulting in a tendency for said core to be translated, and wherein said means interconnecting said first and second link means interconnects said torque and said cable casing such that rotation of said torque tube will result in rotation of said cable, in the region in which its casing is interconnected with said torque tube, through the same arc of movement as the interconnected end of said core.

8. A remote control mechanism as claimed in claim 7, wherein said means interconnecting said first and second link means is a rigid member in which said cable casing is clamped against movement and to which said torque tube is affixed.

9. A remote control mechanism as claimed in claim 8, wherein said control member is pivoted to means fast with said torque tube for pivotal movement about said second pivot axis and with respect to said torque tube when effecting translation of said core, and wherein said torque tube is mounted for rotation in a pair of spaced bearing means by which to rotate about its longitudinal axis when said control member is pivoted about said first pivot axis which is said longitudinal axis of said torque tube.

10. A remote control mechanism as claimed in claim 9, wherein the end of said torque tube proximal to said control member is journalled for rotation in a first one of said bearing means and is axially slidable therein, and wherein the end of the torque tube distal from said control member is mounted for rotation in a second one of said bearing means and is axially fixed relative thereto, by which axial loadings imparted to said torque tube upon pivotal movement of said control member about said second pivot axis are reacted at said second bearing means.

11. A remote control mechanism as claimed in claim 10, wherein said second bearing means incorporates a vibration isolating means and/or is mounted on a vibration isolated part of the chassis of a vehicle.

12. A remote control mechanism as claimed in claim 10, wherein said pivotal movement of said control member about its said first pivot axis effects a rail select movement of a gear change device via said torque tube, and wherein said pivotal movement of said control member about its said second pivot axis causes said cable core to effect a rail shift movement of said gear change device.

13. A remote control mechanism as claimed in claim 12, including a second push-pull cable of which the core at one end is operatively associated with said distal end of said torque tube such that said core will translate in response to said rotation of said torque tube to effect said rail select movement.

14. A remote control mechanism as claimed in claim 5, wherein said pivotal movement of said control member about its said first pivot axis effects a rail select movement of a gear change device via said torque tube, and wherein said pivotal movement of said control member about its said second pivot axis causes said cable core to effect a rail shift movement of said gear change device.

15. A remote control mechanism as claimed in claim 14, including a second push-pull cable of which the core at one end is operatively associated with said torque tube in the vicinity of said control member such that said core will translate in response to said rotation of said torque tube to effect said rail select movement.

16. A remote control mechanism as claimed in claim 15, including a lever arm fast for rotation with said torque tube in the vicinity of said control member and operatively interconnected with an input arm of a bell crank lever which is pivotal about an axis passing through the longitudinal axis of said torque tube and whose output arm is operatively interconnected with said one end of said second push-pull cable core.

* * * * *